United States Patent
Nuzum et al.

(10) Patent No.: US 10,049,364 B2
(45) Date of Patent: Aug. 14, 2018

(54) CREDIT AND DEBIT FRAUD CARD USAGE MONITORING FOR TRANSIT

(71) Applicant: Cubic Corporation, San Diego, CA (US)

(72) Inventors: Todd Nuzum, Omaha, NE (US); David Blue, Clayton, CA (US); Robert McEntee, Encinitas, CA (US)

(73) Assignee: Cubic Corporation, San Diego, CA (US)

(*) Notice: Subject to any disclaimer, the term of this patent is extended or adjusted under 35 U.S.C. 154(b) by 6 days.

(21) Appl. No.: 14/960,088

(22) Filed: Dec. 4, 2015

(65) Prior Publication Data
US 2016/0162895 A1 Jun. 9, 2016

Related U.S. Application Data (60) Provisional application No. 62/087,623, filed on Dec. 4, 2014.

(51) Int. Cl.
*G06Q 20/40* (2012.01)
*G06Q 20/32* (2012.01)
(Continued)

(52) U.S. Cl.
CPC ........... *G06Q 20/405* (2013.01); *G06Q 20/18* (2013.01); *G06Q 20/3226* (2013.01);
(Continued)

(58) Field of Classification Search
CPC .. G06Q 20/4016; G06Q 20/40; G06Q 50/265; G06Q 20/20; G06Q 20/204;
(Continued)

(56) References Cited

U.S. PATENT DOCUMENTS 6,926,203 B1* 8/2005 Sehr ............... G06Q 10/025
235/382
7,389,914 B1* 6/2008 Enright ............ G06Q 20/042
235/379
(Continued)

FOREIGN PATENT DOCUMENTS

CA 2756550 A1 4/2012

OTHER PUBLICATIONS

"Directory of Credit Card Failure Codes," PaySimple: Online Solution to Manage & Grow Your Business. N.p., Jul. 1, 2014. Web. Mar. 23, 2016. http://www.paysimple.com/paysimple30_help/ps30/a7-cc-failure-codes/Directory_of_Credit_Card_Failure_Codes.htm. (9 pages).*

(Continued)

*Primary Examiner* — Elda G Milef
(74) *Attorney, Agent, or Firm* — Kilpatrick Townsend and Stockton, LLP (57) ABSTRACT

A method for detecting fraudulent use of a payment media using a transit server includes receiving, at a transit server, an input from a payment media as part of a payment transaction at a first transit fare vending machine. The input includes an account identifier associated with a payment account of the payment media. Authentication information is received and an authentication request is communicated to an issuer of the payment account. The authentication request includes the account identifier. Information indicative of improper use of the payment media is received from one or more of a second transit fare vending machine or the issuer of the payment account. A determination is made, based on the information, that the payment media is being used improperly. An improper use alert is communicated to an enforcement authority. The improper use alert includes identification information related to the payment transaction.

19 Claims, 6 Drawing Sheets

(51) Int. Cl.
  *G06Q 20/18* (2012.01)
  *G06Q 50/30* (2012.01)
  *G06Q 10/10* (2012.01)
  *G06Q 50/00* (2012.01)

(52) U.S. Cl.
  CPC ..... *G06Q 20/3255* (2013.01); *G06Q 20/4012* (2013.01); *G06Q 20/4016* (2013.01); *G06Q 20/40145* (2013.01); *G06Q 50/30* (2013.01); *G06Q 10/10* (2013.01); *G06Q 50/01* (2013.01)

(58) Field of Classification Search
  CPC .... G06Q 20/322; G06Q 20/382; G06Q 20/10; G06Q 20/18; G06Q 20/341; G06Q 20/401; G06Q 20/40145; G06Q 20/3226; G06Q 20/367; G06Q 20/3821; G06Q 20/405; G06Q 20/409; G06Q 10/0635; G06Q 20/351; G06Q 20/407; G06Q 2220/10; G06Q 30/0225; G06Q 30/0609; G06Q 50/01; G06Q 10/02; G06Q 10/06; G06Q 20/045; G06Q 20/0457; G06Q 20/4014; G06Q 20/4093; G06Q 30/0222; G06Q 20/34; G06Q 20/3224; G06Q 20/206
  See application file for complete search history.

(56) References Cited

U.S. PATENT DOCUMENTS 9,626,678 B2 * 4/2017 Ovick ............. G06Q 20/40145

2003/0163708 A1* 8/2003 Tang .................... G06Q 20/341
  713/185
2004/0210498 A1* 10/2004 Freund .................. G06Q 20/10
  705/30
2004/0248555 A1* 12/2004 Herrmann ............. G06Q 20/18
  455/411
2007/0138256 A1* 6/2007 Coventry ................ G07F 19/20
  235/379
2008/0091944 A1* 4/2008 von Mueller ........ G06Q 20/085
  713/168
2008/0195540 A1* 8/2008 Gee .................... G06Q 20/1085
  705/43
2008/0222706 A1* 9/2008 Renaud ............... H04L 63/1408
  726/4
2012/0278137 A1* 11/2012 Dixon .................. G06Q 20/322
  705/13
2012/0296692 A1* 11/2012 O'Malley .......... G06Q 10/0635
  705/7.28
2015/0066764 A1* 3/2015 Crowell ............. G06K 9/00308
  705/44
2015/0302404 A1* 10/2015 Ruffer .................... G06Q 20/10
  705/44

OTHER PUBLICATIONS

International Search Report and Written Opinion for PCT/US2015/064114 dated Mar. 29, 2016, 12 pages.
International Preliminary Report on Patentability dated Jun. 15, 2017 for PCT/US2015/064114; 8 pages.

* cited by examiner

CREDIT AND DEBIT FRAUD CARD USAGE
MONITORING FOR TRANSIT

CROSS-REFERENCES TO RELATED
APPLICATIONS

This application claims priority to U.S. Provisional Patent Application No. 62/087,623 filed Dec. 4, 2014, entitled "CREDIT AND DEBIT FRAUD CARD USAGE MONITORING FOR TRANSIT," the entire disclosure of which is hereby incorporated by reference, for all purposes, as if fully set forth herein.

BACKGROUND OF THE INVENTION

Transit agencies are an easy target for criminals to use a lost, stolen, or counterfeit card due to the number of unattended terminals that a transit agency deploys for access in the system, as well as a number of unattended vending machines for purchasing transit fare. The large number of unattended devices makes it especially difficult to detect and stop the fraudulent usage of a payment media. Additionally, when fraud is detected, it is typically much later than the transaction attempt. The detection typically occurs when the transaction is later settled with an issuing bank. This makes catching fraudsters especially difficult.

BRIEF SUMMARY OF THE INVENTION

The present invention relates generally to fraudulent card detection in transit systems, although the systems and methods for detecting fraud disclosed herein may be implemented in any purchase transaction system, as well as other financial systems such as automated teller machines (ATM). Embodiments, provided herein utilize a new process, which allows for the ability to set business rules that will trigger events to local authorities of fraud usages in a transit system is unique in that the events will happen in near real-time. Tying the delivery of the events into a social media application like Twitter® makes catching a fraudster in the act possible.

In one aspect, a method for detecting fraudulent use of a payment media using a transit server is provided. The method may include receiving, at a transit server, an input from a payment media as part of a payment transaction at a first transit fare vending machine. The input may include an account identifier associated with a payment account of the payment media. The method may also include receiving authentication information and communicating an authentication request to an issuer of the payment account. The authentication request may include the account identifier. The method may further include receiving information indicative of improper use of the payment media from one or more of a second transit fare vending machine or the issuer of the payment account. The method may include determining, based on the information, that the payment media is being used improperly. The method may also include communicating an improper use alert to an enforcement authority. The improper use alert may include identification information related to the payment transaction.

In another aspect, a non-transitory computer-readable medium having instructions embedded thereon for detecting fraudulent use of a payment media using a transit server is provided. The instructions may include computer code for causing a computing device to receive, at a transit server, an input from a payment media as part of a payment transaction at a first transit fare vending machine. The input may include an account identifier associated with a payment account of the payment media. The instructions may also include computer code for causing a computing device to receive authentication information and to communicate an authentication request to an issuer of the payment account. The authentication request may include the account identifier. The instructions may further include computer code for causing a computing device to receive information indicative of improper use of the payment media from one or more of a second transit fare vending machine or the issuer of the payment account. The instructions may include computer code for causing a computing device to determine, based on the information, that the payment media is being used improperly. The instructions may also include computer code for causing a computing device to communicate an improper use alert to an enforcement authority. The improper use alert may include identification information related to the payment transaction.

In another aspect, a system for detecting fraudulent use of a payment media using a transit server is provided. The system may include a communication interface configured to send and receive data, a memory, and a processor. The processor may be configured to receive an input from a payment media as part of a payment transaction at a first transit fare vending machine. The input may include an account identifier associated with a payment account of the payment media. The processor may also be configured to receive authentication information and to communicate an authentication request to an issuer of the payment account. The authentication request may include the account identifier. The processor may be further configured to receive information indicative of improper use of the payment media from one or more of a second transit fare vending machine or the issuer of the payment account. The processor may be configured to determine, based on the information, that the payment media is being used improperly. The processor may also be configured to communicate an improper use alert to an enforcement authority. The improper use alert may include identification information related to the payment transaction.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The present invention relates generally to fraudulent card detection in transit systems, although the systems and methods for detecting fraud disclosed herein may be implemented in any purchase transaction system, as well as other financial systems such as automated teller machines (ATM). Embodiments, provided herein utilize a new process, which allows for the ability to set business rules that will trigger events to local authorities of fraud usages in a transit system is unique in that the events will happen in near real-time. Tying the delivery of the events into a social media application like Twitter® makes catching a fraudster in the act possible.

The fraud alert processes described herein monitor all unattended terminal transactions for specific response codes and fraudulent usage patterns. Once the fraud has been detected, a message is triggered to local authorities via a data service, such as SMS, Twitter®, or email. The services provides the location, time, date, amount, card status from the issuing bank, transaction response codes, AVS response code and in the case of debit cards, the number of PIN debit failures. The name on the payment card may also be provided. The local authority can monitor the data services for a specific location based on criminal activity or for a specific customer's card that has been reported stolen. The systems and methods described herein require no additional hardware at the ticket vending machine and only limited software changes the current system.

Additionally, such systems offer further value to a transit agency by providing better security for their customers by reducing the charge back costs on acceptance of lost, stolen or counterfeit cards. If criminals know that credit and debit transactions are monitored for lost, stolen or counterfeit card usage, they will be less likely to use the transit agency's unattended terminals. Further value is added for local authorities, as the authorities gain easier access to fraudulent data and near real-time access to fraudulent credit and debit card usages in the transit system. Embodiments can be expanded to monitor usages of the transit card (pass or stored value) for usages. The detection of a specific card can be extended into the type of the cards being used.

Some embodiments of the invention can include adding pictures or video data from the ticket vending machine at the time of the fraud. Further embodiments of the invention can make it possible to detect fraud and generate and send these alerts to authorities such as law enforcement agencies with no additional hardware at the ticket vending machine and limited software changes. While largely discussed in transit applications, it will be appreciated that the systems and methods described herein may be implemented in any application where a payment media is used, especially in unmanned applications such as vending machines and parking meters.

Figure 1:
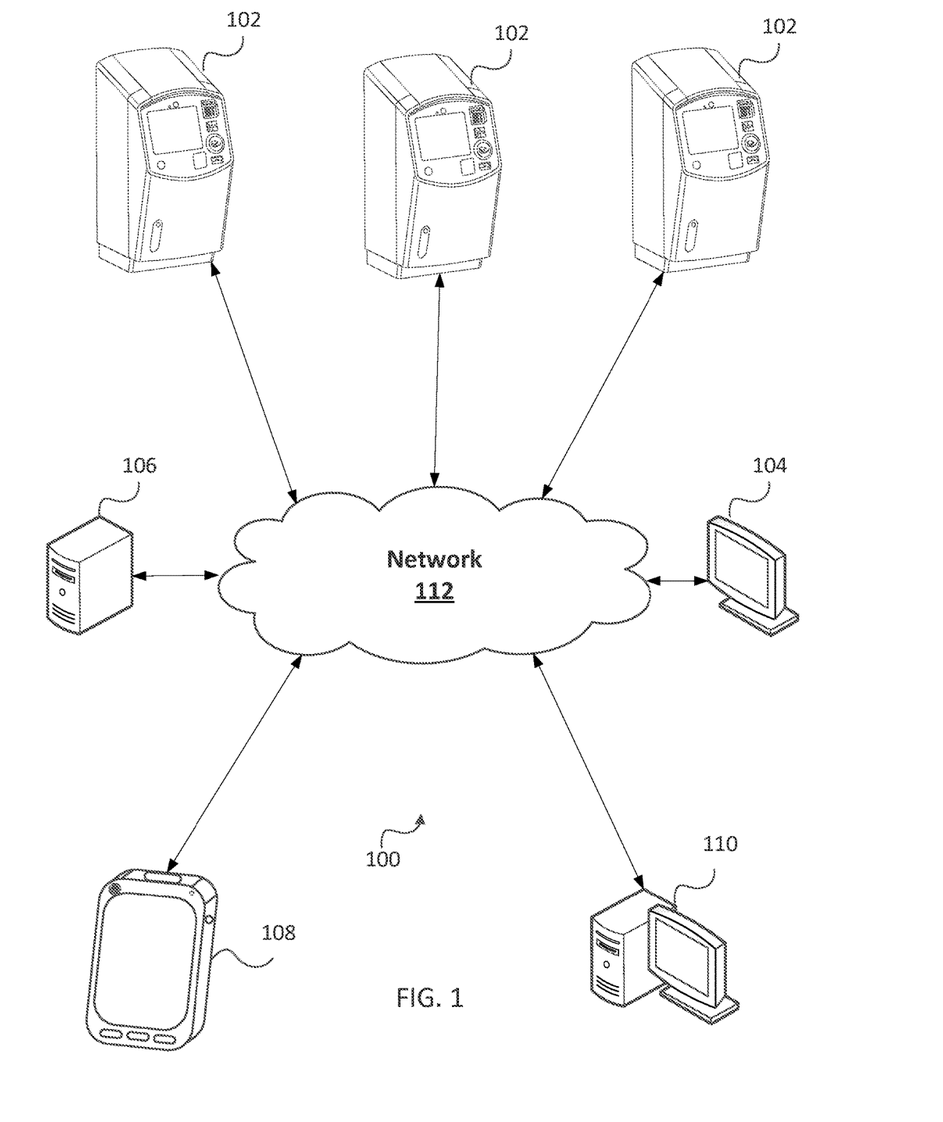
FIG. 1 is a system diagram of a system for detecting fraud and alerting an authority according to embodiments.

Turning now to FIG. 1, a system 100 for fraud detection and alerting is shown. System 100 may include a number of vending machines 102 or other point of sale devices. Each of the vending machines 102 may be configured to conduct purchase transactions and issue payment media. For example, a vending machine 102 may include one or more payment readers, such as magnetic stripe readers, near field communication (NFC) and/or other radio frequency (RF) transceivers such that payment transactions may be conducted using a payment media, such as a smart card, credit card, debit card, and/or other physical payment media. The vending machine 102 may also include a display, such as a touchscreen, and one or more input devices, such as a keypad, to allow a user to interact with the vending machine 102. Interactions may include selecting a transit product, navigating a user interface and/or menu of the vending machine 102, selecting a payment account, inputting authentication credentials, and the like. In some embodiments, the vending machine 102 may include one or more biometric sensors, such as fingerprint scanners, retinal scanners, and the like. This enables the vending machine 102 to receive a biometric input from a user and compare the input to a database of known users to help verify that the user of the payment media is who he says he is. Such inputs may be required, for example, when a threshold transaction amount is exceeded and/or a certain type of payment is used. Such a use of biometric identifiers further decreases the likelihood that a fraudulent transaction will take place using vending machine 102. The vending machine 102 may also include one or more imaging devices, such as a still or video camera. Images captured at such devices may be used to identify a user attempting to use a particular fare media. These images may help authorities identify a user who is suspected of fraudulent and/or criminal use of a payment media.

Vending machine 102 may also include one or more network interfaces. This allows the vending machine 102 to communicate with an issuer system 104 or other financial system associated with the payment media such that a transaction may be authorized. The one or more network interfaces may also allow the vending machine 102 to communicate with a transit server 106, such as to check data associated with a transit account, or to poll a database for matching images and/or biometric inputs associated with an owner of a transit account. Further connections may be established between the vending machine 102 and a fare inspection device 108, and an authority system 110. The vending machine 102, issuer system 104, transit server 106, fare inspection device 108, and authority system 110 may be communicatively interconnected using one or more networks 112.

Network 112 may be a local area network (LAN) and/or other private or public wired and/or wireless networks. Network 112 may utilize one or more of Wi-Fi, ZigBee, Bluetooth™, Bluetooth™ Low Energy, a cellular communications protocol such as 3P, MG, or LTE, and/or any other wireless communications protocol. Network 112 may be communicatively coupled with one or more of the components of the system 100 to facilitate communication between the various components. It will be appreciated that one or more different network connections may be used in accordance with the invention, and that the use of a single network 112 to enable communications is merely one example of such configurations. For example, each component may be communicatively coupled with other components using a separate network for one or more of the connections.

Issuer system 104 may be a computing system operated by a bank or other financial institution that issues the payment media and/or maintains a payment account associated therewith. The issuer system 104 may be configured to receive and process authorization requests. For example, a user may interact with a payment reader of vending machine 102, causing an authorization request, along with an account identifier associated with the payment media, to be sent to the issuer system 104, such as using network 112 or by being forwarded to the issuer system 104 using the transit server 106. In some embodiments, vending machine 102 may also prompt the user to enter one or more authentication credentials, such as a PIN number, zip code, and/or other information that may verify the user's identity. This information may also be sent to the issuer system 104. The issuer system 104 may determine whether the payment account associated with the payment media has sufficient funds and/or is otherwise authorized for use in that particular transaction. Upon this determination being made, the issuer system 104 may communicate an authorization decision, which may include an authorization reply code, to the vending machine 102 and/or transit server 106. Authorization reply codes may indicate that a transaction is approved or denied. In some embodiments, the authorization reply code may be an address verification system (AVS) code. In embodiments where an authorization reply code indicates denial of a transaction, the code may indicate a reason for denial. For example, an insufficient funds indication may be provided. Other denial codes may include codes indicated that the payment media has been reported lost and/or stolen. The transit system may receive these denial codes and use them to determine a proper action. For example, an insufficient funds denial code may cause the transit server 106 and/or vending machine 102 to prompt the user for a new payment media. For denial codes where lost and/or stolen payment media are involved, as well as other denial codes indicating criminal and/or fraudulent activity, a notification may be communicated to one or both of the fare inspector device 108 and authority system 110.

Fare inspector device 108 may be a handheld or otherwise portable device that is carried by a fare inspector or other transit system personnel. Fare inspector device 108 may be configured to scan a passenger's fare media to determine whether the passenger has a valid fare media for a particular trip. Fare inspector device 108 may receive a denial code associated with an attempt to purchase a fare media at vending machine 102. In embodiments where the denial code indicates fraudulent and/or criminal activity, the fare inspector device 108 may receive a notification. This allows a fare inspector or other personnel to look into the situation. For example, a notification including a location, time, date, amount, card status from the issuer system 104, authorization reply codes, AVS response code, and in the case of debit cards, the number of PIN debit failures. In some embodiments, an AVS response code and/or other denial code may indicate the number of PIN or other credential failures. The name on the payment card may also be provided. In some embodiments, an image of the user's face and/or an identity matched using biometric input may be provided to the fare inspector device 108. This further aids the fare inspector in identifying a possible suspect of fraudulent and/or criminal behavior.

Similarly, an authority system 110, such as a law enforcement agency and/or other authority agency, may receive notifications when fraudulent and/or criminal activity is detected. The notification may include similar information as described above with regard to the fare inspector device 108. The notification may be in the form of an automated phone call, an SMS message, email, push alert, and/or other automated and/or electronic message. In this manner, the law enforcement agency or other authority system 110 may be notified in near-real-time, as soon as the transit server 106 and/or vending machine 102 determine that there may be fraudulent and/or criminal behavior.

In some embodiments, server 106 may be configured to route communications between the vending machine 102 and the other components. Server 106 may also store transit accounts and information associated therewith. For example, the information may include payment account information, facial images and/or biometric identifiers of the owners of the transit accounts, and/or other information. The transit server 106 may receive inputs from the vending machine 102 during each transaction and match the inputs, such as images, biometric inputs, and the like, to those stored on transit server 106 and/or a network attached storage (NAS) system (not shown).

Figure 2:
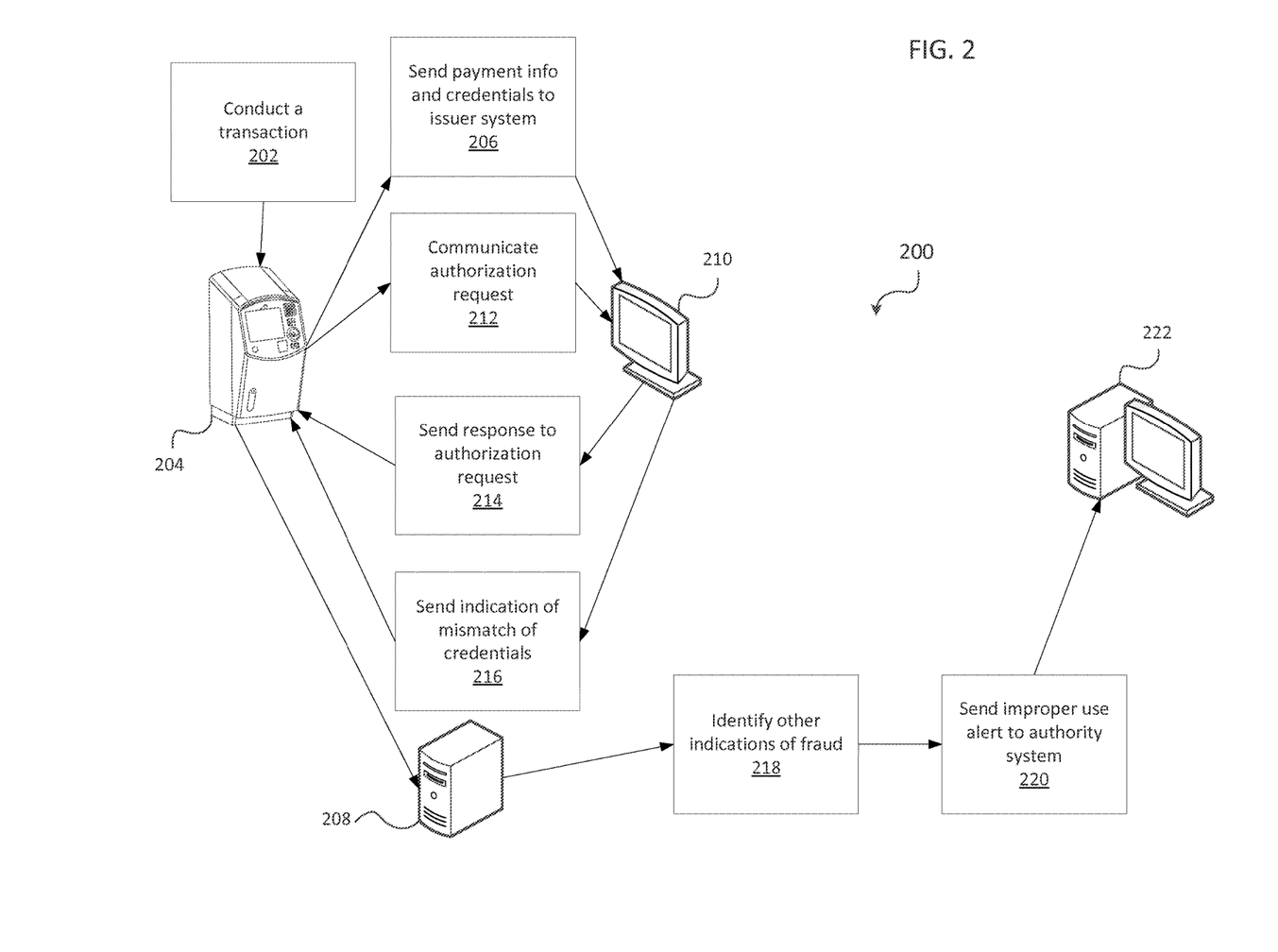
FIG. 2 is a flowchart of a process for detecting fraud and alerting an authority according to embodiments.

FIG. 2 depicts a flowchart of a fraud detection and alert process 200. At block 202 a user may use a credit/debit card or other payment media to conduct a transaction at a vending machine 204. The vending machine 204 may be positioned at a bus, rail, or other transit station, and/or at other locations. The user may be required to enter authentication credentials, such as a zip code, PIN number, and/or other data used to identify the user. At block 206, this information, along with payment information including an account identifier, may be sent to a transit server 208 and/or an issuer system 210, where the authentication credentials are verified. If the authentication credentials match stored credentials, an authorization request for the amount of the purchase transaction may be communicated to the issuer system 208 at block 212. If the authentication credentials do not match stored credentials, a response indicating the mismatch may be communicated to both the vending machine 204 and the transit server 208 at block 214. This mismatch response may be stored at the transit server 208, along with a date, location, time, and/or other information associated with the transaction. Such mismatch information may be useful in determining that there may be a likelihood of fraudulent activity, especially when multiple mismatch notifications are received by the transit server 208 from one or more vending machines 204 of the transit system within a predetermined period of time.

At block 216, an approval or denial response is communicated from the issuer system 210 to the vending machine 202 and/or transit server 208. The response may include an authentication reply code, such as an AVS code, that includes a reason for denial. This reply code may be stored on the transit server 208. Based on the denial code and reason for denial, the vending machine 202 and/or transit server 208 may determine there is a likelihood of fraudulent behavior. For example, the authentication reply code may indicate that the transaction was denied due to the payment media being reported as lost and/or stolen Additional indications of fraud may also be identified at block 218. For example, the transit server 208 may look up any authentication credentials entered during transactions for the particular payment media. This may include accessing zip code entries, PIN number entries, and/or other credentials entered at a vending machine. If a threshold number of incorrect entries have been received within a predetermined time, from one or more vending machines 202, it serve as an indication that a user has a lost or stolen card and is trying to guess the correct authentication credentials. For example, a user may make 2-3 attempts at guessing a zip code or PIN of the payment media at a first vending machine 202 before moving onto a second vending machine 202 to continue the attempt. In conventional systems, such behavior tends to hide fraudulent activity, as a few incorrect attempts tends not to lock out a user or cause an issuer of the payment media to be alarmed. By monitoring and storing these incorrect entries, and later looking up the frequency, location, time, and other historical information related to the incorrect entries associated with a single payment media, the systems and methods are capable of detecting fraudulent activity more quickly.

Additional fraud detection may be done by communicating with issuer system 210 to identify whether incorrect PIN and other credentials have been entered at merchants and other systems outside of the transit system. A pattern of incorrect entries, both within and out of the transit system, may signal that a user is attempting to hack or guess the identity credentials of a lost or stolen payment media. For example, a user may attempt to use a debit card at a gas station, ATM, and/or other device outside the transit system. The transit server 208 may retrieve information related to these attempts and use this information in determining whether a payment media is begin fraudulently used in the transit system. Additionally, the transit system may flag each transaction where the amount exceeds a particular threshold. For example, for transactions above a certain dollar amount or within a certain percentile may be flagged either as possibly fraudulent and/or for further investigation. This may cause the authorities to be alerted and/or for a deeper analysis to be completed. For example, if a transaction is in the top 1% of transaction amounts, a deeper analysis, including looking into transactions at nearby merchants, looking into mismatched credentials, and/or other analysis may be triggered, while in other embodiments, some or all of such analysis may be done for each transaction. Similarly, transactions conducted at a certain time of day may be flagged as possibly fraudulent. For example, transactions conducted when no busses and/or trains are running may be indicative of a user trying to take advantage of an empty station to go around to different vending machines 202 to guess a PIN or other credential.

Upon determining that a payment media being used is likely lost, stolen, and/or otherwise being used fraudulently, the transit server 208 and/or vending machine 202 may send an improper use alert to an authority system 222, at block 220. The determination may be made using the mismatched credential data, a transaction response code, and/or data from other merchants and devices. The improper use alert may be an SMS message, email, automated phone message, and/or other electronic notification capable of real-time or near-real-time alerts. The improper use alert may also be sent to a fare inspector device.

Figure 3A:
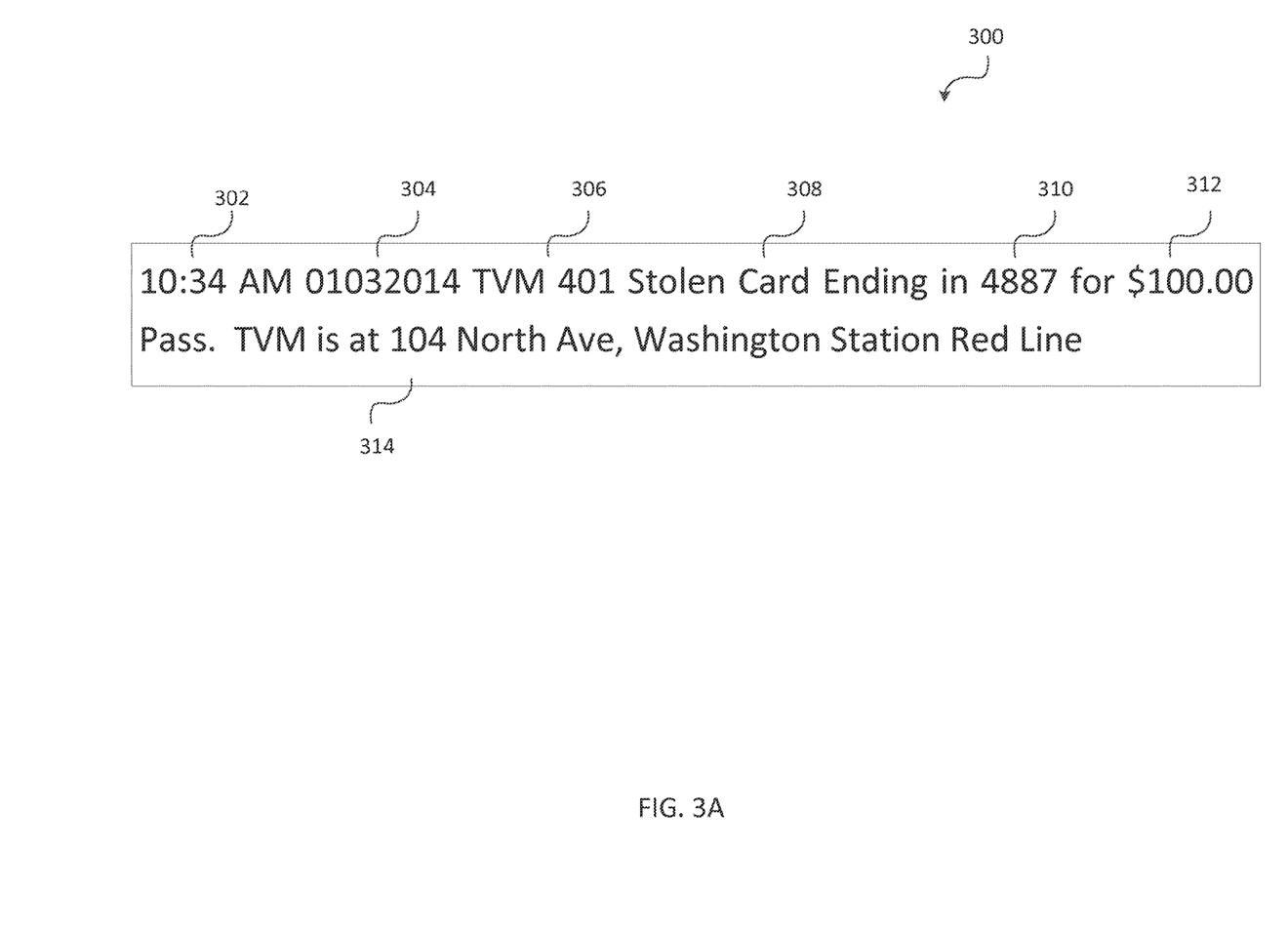
FIG. 3A is an improper use alert according to embodiments.
Figure 3B:
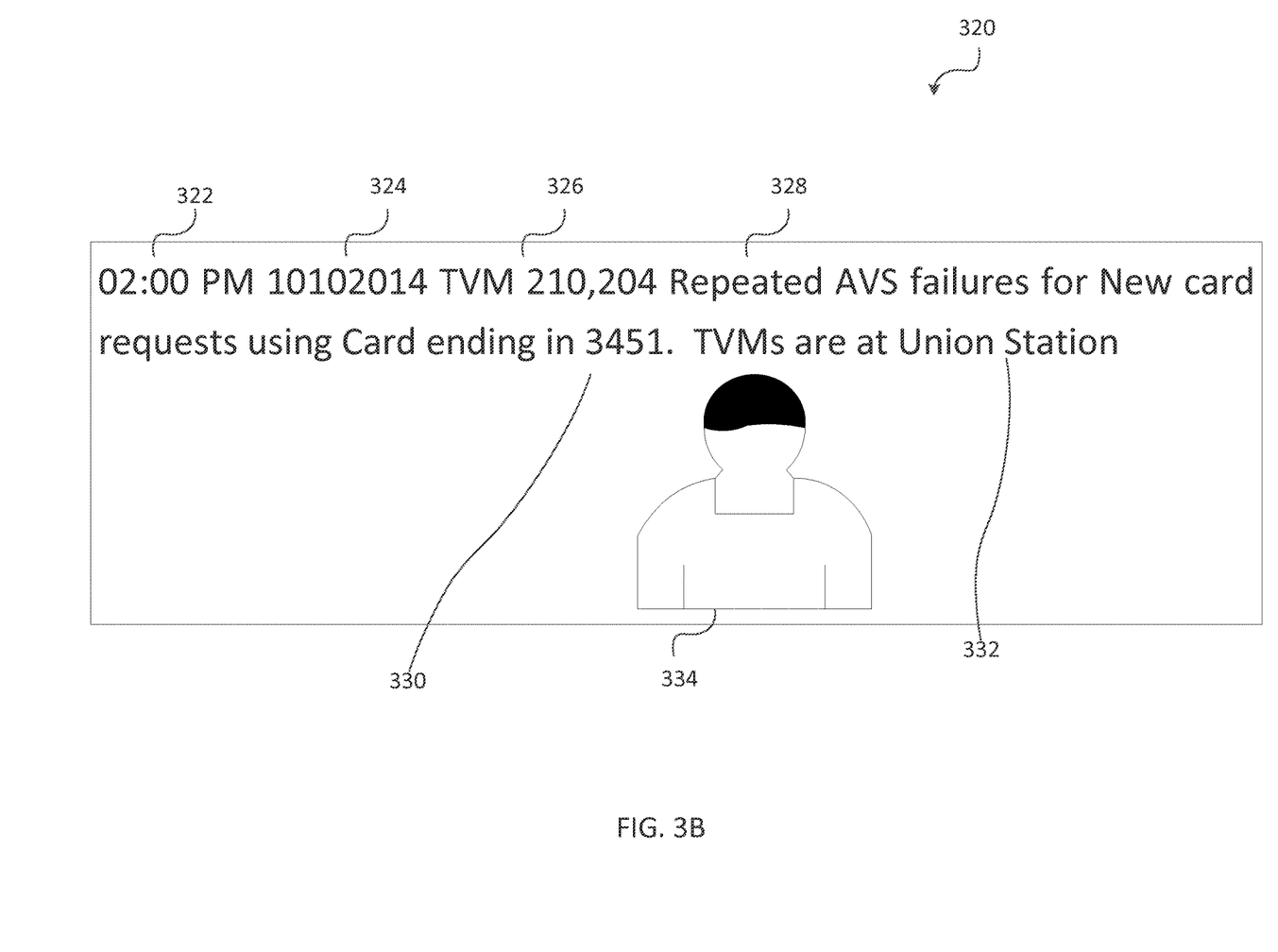
FIG. 3B is an improper use alert according to embodiments.

FIG. 3A depicts an embodiment of an improper use alert 300. Improper use alert 300 may identify a time 302 and/or a date 304 of the improper use, a vending machine identifier 306 of the vending machine or other device at which the transaction was attempted, an explanation of the improper use 308, a payment media identifier 310, a transaction amount 312, and/or a location 314 of the vending machine. The explanation of improper use 308 may match a denial code or other authentication reply code received from an issuer system and/or may be generated by the vending machine and/or the transit server based on a number of suspicious actions within the transit system and/or other merchants. Here, the explanation of improper use 308 explanation that the card was reported to the issuer as being stolen. The payment media identifier may include a credit or debit card number and/or other identifier of the payment media. The In some embodiments, multiple reasons of improper use and corresponding explanations of improper use 308 may be present in a single alert, such as when a user has too many invalid PIN attempts using a card that is reported as lost or stolen. Other information may also be included, such as a number of invalid PIN or other credential attempts. Additionally, information identifying the registered owner of the payment media, such as a name, address, phone number, email address, and/or photo may be included on the alert. This allows authorities to contact the owner to see if the use of the payment media was known about and/or authorized. FIG. 3B depicts another embodiment of an improper use alert 320. Improper use alert 320 may include a time 322 and/or a date 324 of the transaction, a vending machine identifier 326, one or more explanations of improper use 328, a payment media identifier 330, a location 332 of the vending machine, and an image 334 of the person attempting to use the payment media. Here, the explanation of improper use 328 includes a statement that there were multiple credential mismatches using the specified payment media. The image 334 may be captured using an image capture device of the vending machine at some point during the transaction process. The image 334 may be useful in identifying and/or tracking down the person suspected of fraudulent behavior. It will be appreciated that other combinations of information may be included on improper use alerts 300 and 320.

Figure 4:
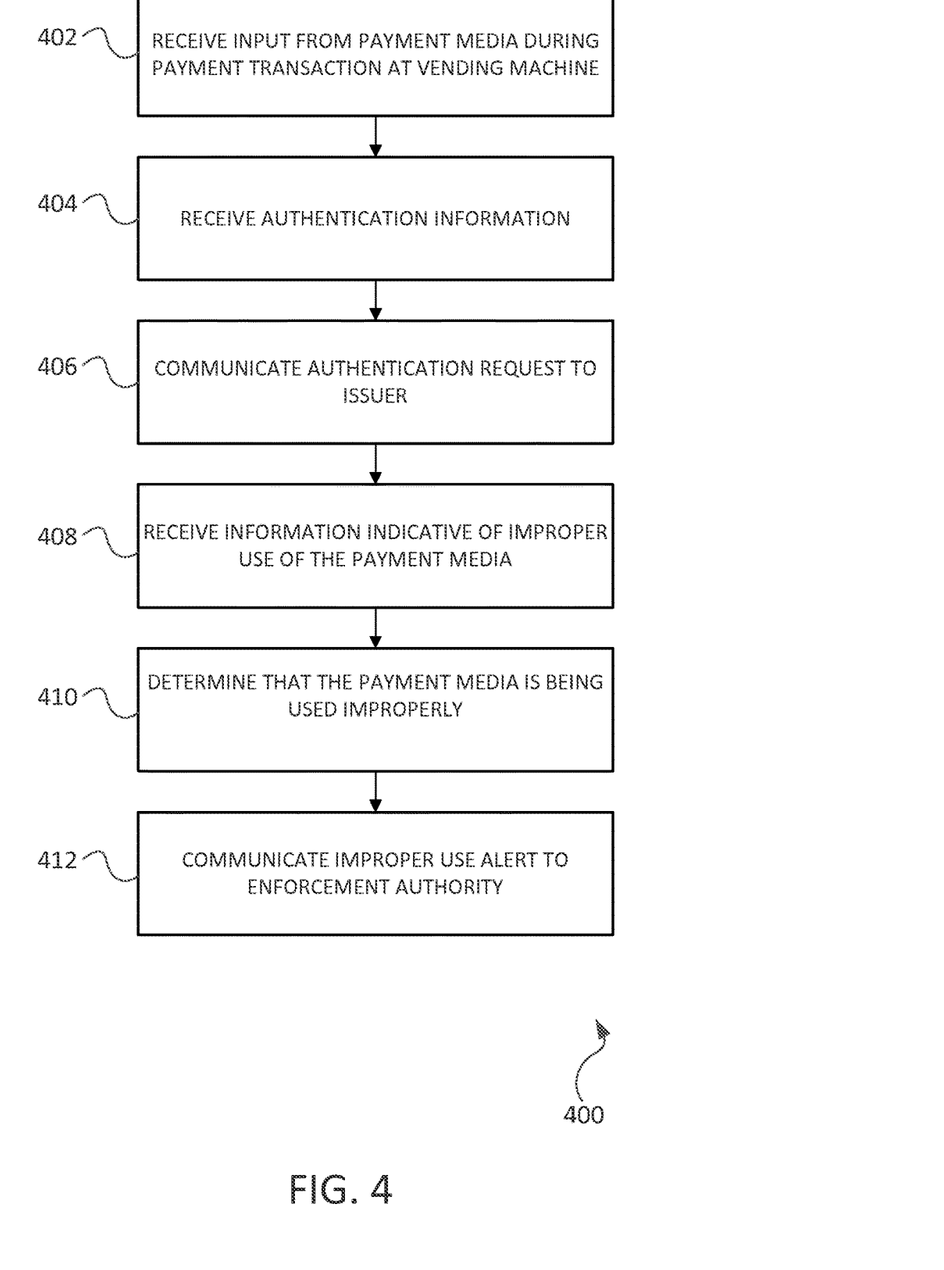
FIG. 4 is a flowchart of a process for detecting fraud and alerting an authority according to embodiments.

FIG. 4 depicts a flowchart of a process 400 for detecting fraudulent use of a payment media and alerting authorities to this use. Process 400 may be performed by a vending machine and/or a transit server, such as those described herein. Process 400 may begin with receiving an input from a payment media as part of a payment transaction at a first transit fare vending machine at block 402. The input may include an account identifier associated with a payment account of the payment media, as well as a transit fare product and/or a transaction amount. At block 404, authentication information may be received. For example, a user may input one or more identity credentials, such as a zip code and/or a PIN number, that identify the user as an owner or other authorized user of the payment account. An authentication request may be communicated to an issuer of the payment account at block 406. The authentication request may include the account identifier, as well as the transaction amount. A determination may be made as to whether the transaction should be authorized. This may include verifying that sufficient funds are in the account, as well as matching the authentication information with information stored by the issuer.

In some embodiments, the process 400 may further include determining that the authentication information is invalid. For example, the user may enter the wrong zip code, PIN number, and/or other identity credential. The issuer may inform the transit system such that it causes the vending machine to display a prompt to re-input authentication information. An additional input may be received that includes subsequent authentication information. A determination may be made that the subsequent authentication information is invalid. This may be cause the transit system to determine that the payment media is being used improperly. A transit system and/or issuer may select a number of iterations of these steps before locking a user out of a payment account and/or alerting a transit or law enforcement authority.

At block 408, information indicative of improper use of the payment media may be received from one or more of a second transit fare vending machine or the issuer of the payment account. This information may be in the form of a denial code indicative of a lost or stolen payment media and/or other denial indicative of fraudulent use from the issuer. In some embodiments, the information may be acquired from multiple vending machines of the transit system. This information may include a usage pattern of the payment media received from one or more of the second transit fare vending machine or a merchant, the usage pattern being indicative of improper use. For example, a user may use different vending machines to make 2-3 attempts to guess a PIN number for the payment media. Information related to multiple invalid PINS may be aggregated and identified as possible fraudulent behavior.

At block 410, a determination may be made, based on the information, that the payment media is being used improperly. Improper use may include the use of a lost or stolen card, using a counterfeit payment media, and/or any other fraudulent use of a payment media. An improper use alert may be communicated to an enforcement authority at block 412. The improper use alert may include identification information related to the payment transaction, such as that described in FIGS. 3A and 3B. The improper use alert may include one or more of a short message service (SMS) message, a message from a social media account, or an email. In some embodiments, the transit system may cause a payment authentication decision notification to be delayed from being displayed at the vending machine upon determining that the payment media is being used improperly. For example, a message indicating that the transaction is being processed may be presented on a display of the vending machine while the authorities are alerted. In other embodiments, a message such as a card read error instructing the user to reinsert the payment media or otherwise interact with the vending machine may be displayed. This provides the authorities additional time to arrive at the vending machine and identify a suspected fraudster.

In some embodiments, an image capture device is included on the vending machine. The image capture device, such as a video or still camera, may capture an image of a user of the payment media using the image capture device. This image may be stored within the transit system. The image may be captured at any point of the transaction. For example, an image may be taken immediately upon commencement of a transaction. This allows any image to be compared to a stored image associated with the payment media being used. If the captured image matches the stored image, it may be determined that the user is likely the registered user. If the captured image does not match the stored image, it may be determined that there is a likelihood of improper use, which may cause the user to be flagged and the authorities to be identified. In other embodiments, the image may be captured upon a determination that there is improper use as identified by means other than image matching. The image capture device may then capture an image of the user's face. An image of the user's face may be included on an improper use alert to help authorities identify and locate the user. In some embodiments, the improper use alert and/or image may also be communicated to a fare inspector device.

Figure 5:
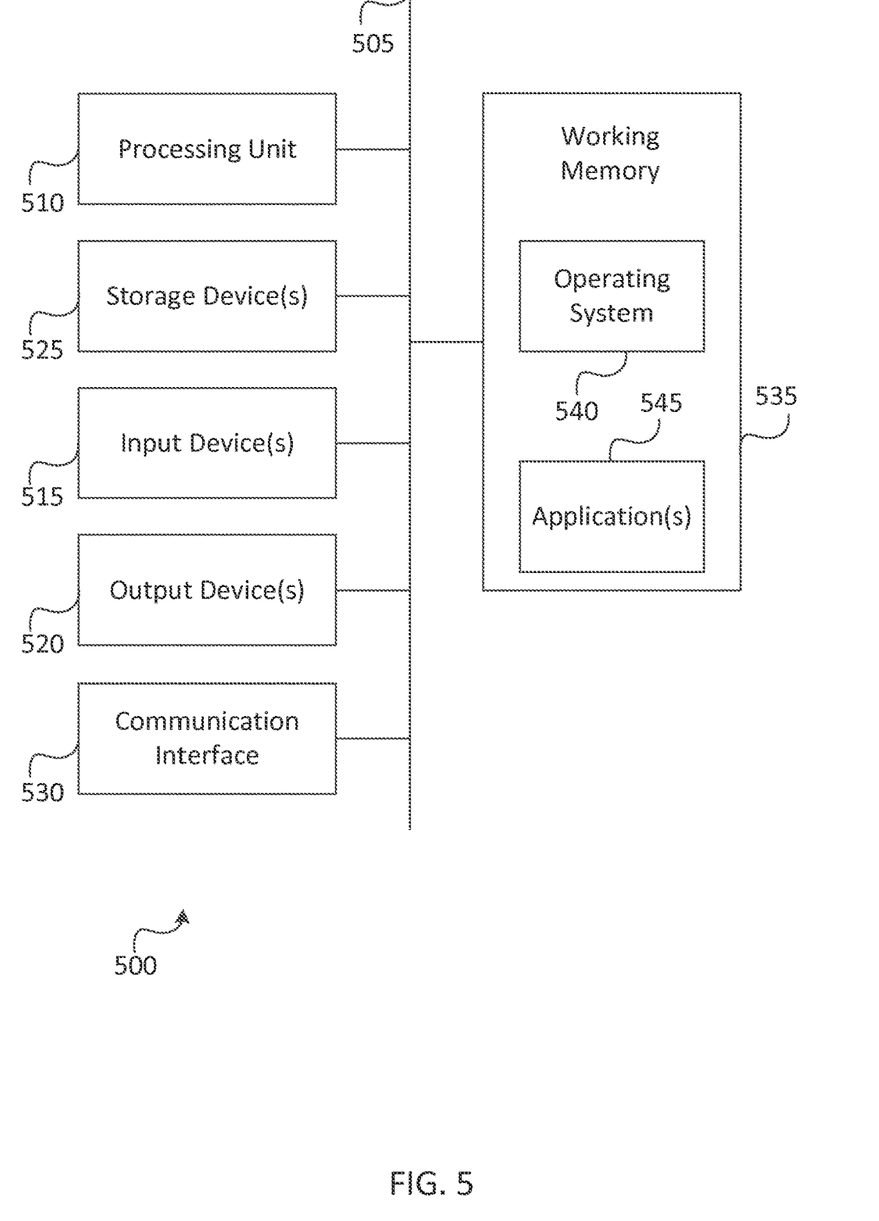
FIG. 5 is a block diagram of an example computing system according to embodiments.

A computer system as illustrated in FIG. 5 may be incorporated as part of the previously described computerized devices. For example, computer system 500 can represent some of the components of the vending machines, transit servers, issuer systems, rare inspector devices, and/or authority systems as described herein. FIG. 5 provides a schematic illustration of one embodiment of a computer system 500 that can perform the methods provided by various other embodiments, as described herein, and/or can function as the host computer system, a remote kiosk/ terminal, a ticket vending machine or other point-of-sale device, a mobile device, and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, receiver, a motion sensor, a camera, a smartcard reader, a contactless media reader, and/or the like; and one or more output devices 520, which can include without limitation a display device, a speaker, a printer, a writing module, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/ or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A method for detecting fraudulent use of a payment media using a transit server, the method comprising:

receiving, at a transit server, an input from a payment media as part of a payment transaction at a first transit fare vending machine, the input comprising an account identifier associated with a payment account of the payment media;

receiving, at the transit server, authentication information;

communicating, by the transit server, an authentication request to an issuer of the payment account, the authentication request comprising the account identifier;

receiving, at the transit server, information indicative of improper use of the payment media from one or more of a second transit fare vending machine or the issuer of the payment account;

determining, by the transit server, whether a transaction associated with the information indicative of improper use was conducted while no transit vehicles are operating;

determining, by the transit server, based on the information and the determination of whether the transaction associated with the information indicative of improper use was conducted while no transit vehicles are operating, that the payment media is being used improperly;

in response to determining that the payment media is being used improperly, the transit server causing at least one image capture device to capture one or both of a video or a still image of a user of the payment media;

communicating, by the transit server, an improper use alert to a remote computing device of an enforcement authority, the improper use alert comprising identification information related to the payment transaction and the one or both of the video or the still image of the user of the payment media captured by the at least one image capture device; and upon determining that the payment media is being used improperly, providing, by the transit server, a prompt for additional user input while the enforcement authority is alerted, wherein the additional user input is selected to increase the time the user is interacting with the first transit fare vending machine, thereby providing the enforcement authority additional time to arrive at the first transit fare vending machine.

2. The method for detecting fraudulent use of a payment media using a transit server of claim 1, wherein:
the information comprises an authorization reply code received from the issuer, the authorization reply code indicating the payment media is lost or stolen.

3. The method for detecting fraudulent use of a payment media using a transit server of claim 1, wherein:
improper use comprises one or more of the payment media being lost, stolen, counterfeit, or used fraudulently.

4. The method for detecting fraudulent use of a payment media using a transit server of claim 1, wherein:
the information comprises a usage pattern of the payment media received from one or more of the second transit fare vending machine or a merchant, the usage pattern being indicative of improper use.

5. The method for detecting fraudulent use of a payment media using a transit server of claim 1, further comprising:
determining that the authentication information is invalid;
causing the first vending machine to display a prompt to re-input authentication information;
receiving an additional input comprising subsequent authentication information; and
determining that the subsequent authentication information is invalid, wherein determining that the payment media is being used improperly is based at least in part on the determination that the subsequent authentication is invalid.

6. The method for detecting fraudulent use of a payment media using a transit server of claim 1, further comprising:
delaying a payment authentication decision notification from being displayed at the first vending machine upon determining that the payment media is being used improperly to increase the time the user is interacting with the first transit fare vending machine.

7. The method for detecting fraudulent use of a payment media
using a transit server of claim 1, wherein:
the improper use alert comprises one or more of a short message service (SMS) message, a message from a social media account, or an email.

8. A non-transitory computer-readable medium having instructions embedded thereon for detecting fraudulent use of a payment media using a transit server, the instructions comprising computer code for causing a computing device to:
receive, at a transit server, an input from a payment media as part of a payment transaction at a first transit fare vending machine, the input comprising an account identifier associated with a payment account of the payment media;
receive, at the transit server, authentication information;
communicate, by the transit server, an authentication request to an issuer of the payment account, the authentication request comprising the account identifier;
receive, at the transit server, information indicative of improper use of the payment media from one or more of a second transit fare vending machine or the issuer of the payment account;
determine, by the transit server, whether a transaction associated with the information indicative of improper use was conducted while no transit vehicles are operating;
determine, by the transit server, based on the information and the determination of whether the transaction associated with the information indicative of improper use was conducted while no transit vehicles are operating, that the payment media is being used improperly;
in response to determining that the payment media is being used improperly, cause, by the transit server, at least one image capture device to capture one or both of a video or a still image of a user of the payment media;
communicate, by the transit server, an improper use alert to a remote computing device of an enforcement authority, the improper use alert comprising identification information related to the payment transaction and the one or both of the video or the still image of the user of the payment media captured by the at least one image capture device; and
upon determining that the payment media is being used improperly, provide, by the transit server, a prompt for additional user input while the enforcement authority is alerted, wherein the additional user input is selected to increase the time the user is interacting with the first transit fare vending machine, thereby providing the enforcement authority additional time to arrive at the first transit fare vending machine.

9. The non-transitory computer-readable medium of claim 8, wherein:
the information comprises an authorization reply code received from the issuer, the authorization reply code indicating the payment media is lost or stolen.

10. The non-transitory computer-readable medium of claim 8, wherein:
improper use comprises one or more of the payment media being lost, stolen, counterfeit, or used fraudulently.

11. The non-transitory computer-readable medium of claim 8, wherein:
the information comprises a usage pattern of the payment media received from one or more of the second transit fare vending machine or a merchant, the usage pattern being indicative of improper use.

12. The non-transitory computer-readable medium of claim 8, further comprising instructions for causing the computing device to:
determine that the authentication information is invalid;
cause the first vending machine to display a prompt to re-input authentication information;
receive an additional input comprising subsequent authentication information; and
determine that the subsequent authentication information is invalid, wherein determining that the payment media is being used improperly is based at least in part on the determination that the subsequent authentication is invalid.

13. The non-transitory computer-readable medium of claim 8, further comprising instructions for causing the computing device to:
delay a payment authentication decision notification from being displayed at the first vending machine upon determining that the payment media is being used improperly to increase the time the user is interacting with the first transit fare vending machine.

14. The non-transitory computer-readable medium of claim 8, wherein:
the improper use alert comprises one or more of a short message service (SMS) message, a message from a social media account, or an email.

15. A system for detecting fraudulent use of a payment media using a transit server, the system comprising:
a communication interface configured to send and receive data;
a memory; and
a processor configured to:
receive an input from a payment media as part of a payment transaction at a first transit fare vending machine, the input comprising an account identifier associated with a payment account of the payment media;
receive authentication information;
communicate an authentication request to an issuer of the payment account, the authentication request comprising the account identifier;
receive information indicative of improper use of the payment media from one or more of a second transit fare vending machine or the issuer of the payment account;
determine whether a transaction associated with the information indicative of improper use was conducted while no transit vehicles are operating;
determine, based on the information and the determination of whether the transaction associated with the information indicative of improper use was conducted while no transit vehicles are operating, that the payment media is being used improperly;
in response to determining that the payment media is being used improperly, cause at least one image capture device to capture one or both of a video or a still image of a user of the payment media;
communicate an improper use alert to a remote computing device of an enforcement authority, the improper use alert comprising identification information related to the payment transaction and the one or both of the video or the still image of the user of the payment media captured by the at least one image capture device; and
upon determining that the payment media is being used improperly, provide a prompt for additional user input while the enforcement authority is alerted, wherein the additional user input is selected to increase the time the user is interacting with the first transit fare vending machine, thereby providing the enforcement authority additional time to arrive at the first transit fare vending machine.

16. The system for detecting fraudulent use of a payment media using a transit server of claim 15, wherein:
the information comprises an authorization reply code received from the issuer, the authorization reply code indicating the payment media is lost or stolen.

17. The system for detecting fraudulent use of a payment media using a transit server of claim 15, wherein:
improper use comprises one or more of the payment media being lost, stolen, counterfeit, or used fraudulently.

18. The system for detecting fraudulent use of a payment media using a transit server of claim 15, wherein:
the information comprises a usage pattern of the payment media received from one or more of the second transit fare vending machine or a merchant, the usage pattern being indicative of improper use.

19. The system for detecting fraudulent use of a payment media using a transit server of claim 15, wherein the processor is further configured to:
determine that the authentication information is invalid;
cause the first vending machine to display a prompt to re-input authentication information;
receive an additional input comprising subsequent authentication information; and
determine that the subsequent authentication information is invalid, wherein determining that the payment media is being used improperly is based at least in part on the determination that the subsequent authentication is invalid.

* * * * *